United States Patent [19]

Harrison

[11] 4,206,911

[45] Jun. 10, 1980

[54] TRAILER AXLE RE-CENTERING STAND

[76] Inventor: Ronald P. Harrison, 424 E. 46th St., Tacoma, Wash. 98404

[21] Appl. No.: 940,587

[22] Filed: Sep. 8, 1978

[51] Int. Cl.[2] .......... B23Q 3/00

[52] U.S. Cl. .......... 269/296

[58] Field of Search .......... 269/296, 298, 265, 37, 269/40, 41, 43

[56] References C' ,d

U.S. PATENT DOCUMENTS

| | | | |
|---|---|---|---|
| 1,350,119 | 8/1920 | Staley | 269/296 |
| 1,361,262 | 12/1920 | Jacob | 269/296 |
| 1,556,882 | 10/1925 | Weaver | 269/296 |
| 2,406,514 | 8/1946 | Squire | 269/296 |
| 2,903,258 | 9/1959 | Jovanovich | 269/296 |

*Primary Examiner*—Robert C. Watson

*Attorney, Agent, or Firm*—Mattern, Deits, Kessler & Moravan

[57] ABSTRACT

A stand with positioned u-shaped cutouts is capable of re-centering and relocating used trailer axle suspension spring pads. The stand is further capable of controlling the shortening of used trailer axles. Positioned on either side of the u-shaped cutouts are blocks which conform to the dimensions of the housing of the spring pad. The spring pads are first cut from the trailer axles. By placing the spring pad housing on the blocks which are at given distances from each other, the trailer axle suspension spring pads, when re-secured to the trailer axle are assured of being placed at the required center. When the axles are shortened, the axle is cut in half, the spring pads are placed in the desired position, and the axle is welded back together at the desired length.

5 Claims, 5 Drawing Figures

TRAILER AXLE RE-CENTERING STAND

BACKGROUND OF THE INVENTION

Trailer axles are used extensively in the movement of mobile homes. Once the mobile home is set in place, however, the need for the trailer axles is over unless the owner wishes to move the mobile home again.

A business has developed by purchasing the old axles and recycling them for use in the movement of new mobile homes. However, the distance between the suspensions of the trailer axles or the length of the trailer axles themselves often must be changed in order to meet the specifications for moving the new mobile homes.

Previous patents have addressed themselves to axle stands which assist in working on automobile axles. In U.S. Pat. No. 1,350,119 by J. H. Staley and U.S. Pat. No. 1,556,882 by G. E. Weaver jaws or clamps are used to keep the axle being worked upon off the ground.

Similarly, U.S. Pat. No. 2,903,258 by R. Jovanovich discloses a machine repair stand which holds an automobile axle in an elevated position while being worked on. Additionally, the stand is constructed so that a conventional wheel floor jack can move the machine repair stand.

In U.S. Pat. No. 1,361,262 by T. H. Jacob a specialized stand for rear axles is disclosed.

Although, the above described patents do disclose the holding of axles off the ground in order that they may be worked upon, the stands disclosed do not address themselves to the particular problems in re-centering of spring centers of mobile home trailer axles or the shortening of the trailer axles themselves.

The stand disclosed has the capability of securing the trailer axle suspensions at given distances with complete accuracy by the use of blocks. The stand is also capable of holding the spring pads at their relative positions during the welding of the trailer axle suspensions to the axles.

Additionally, saddles are placed between the blocks in order to keep the axle which has been cut for shortening at a given chamber when the axle is once again welded together at the shortened length. Thus, the present invention discloses a stand which not only holds the axle in place to be worked on, but assures without a time-wasting measuring process, that the positioning of the spring pads, the camber of the axle, or the length of the trailer axle itself will be accurate.

SUMMARY OF THE INVENTION

If trailer axles are re-cycled and re-used it is often necessary to change the distance between the suspensions of the trailer axle or to shorten the length of the trailer axle itself. The present invention discloses a stand which assists in both the re-centering of the trailer axle suspensions and the shortening of the trailer axle itself if necessary.

To accomplish the re-centering of the trailer axle suspensions, the trailer axle is placed in cutouts in the sides of the stand. Blocks are positioned above the cutouts. Thus, when spring pads, after having been cut loose from the trailer axle, are placed in position over the blocks, the correct distance between the suspensions is assured. After the spring pads are positioned, the spring pads are welded to the trailer axle. The stand not only assists in welding the spring pads to the trailer axle, but assures the user that the spring pads are in the proper position.

To shorten the trailer axle, a portion of the trailer axle is cut out. To assure proper length, the trailer axle suspensions are positioned over the desired blocks. Saddles placed between the sides of the trailer axle stand receive each cut portion of the trailer axle. The saddles not only provide support for each portion of the trailer axle but assure the trailer axle the proper camber when re-welded.

DETAILED DESCRIPTION OF THE DRAWINGS

Figure 1:
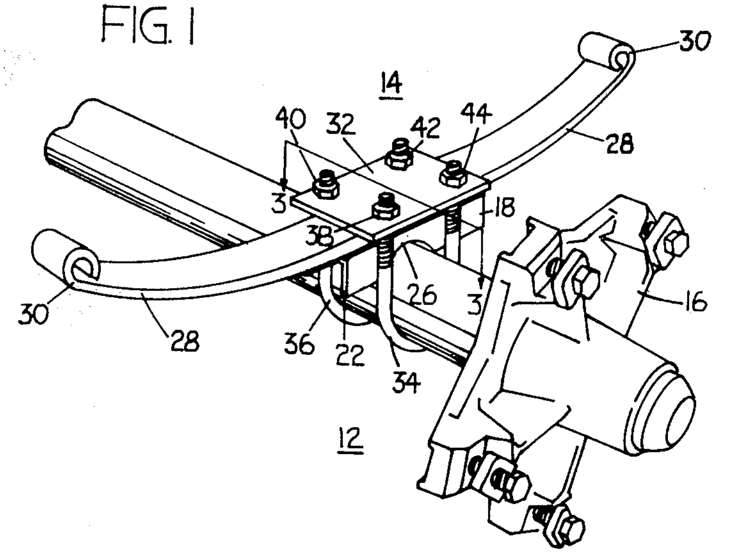
FIG. 1 is a perspective view of one end of a trailer axle, trailer axle hub, and spring pad affixed to the trailer axle.
Figure 2:
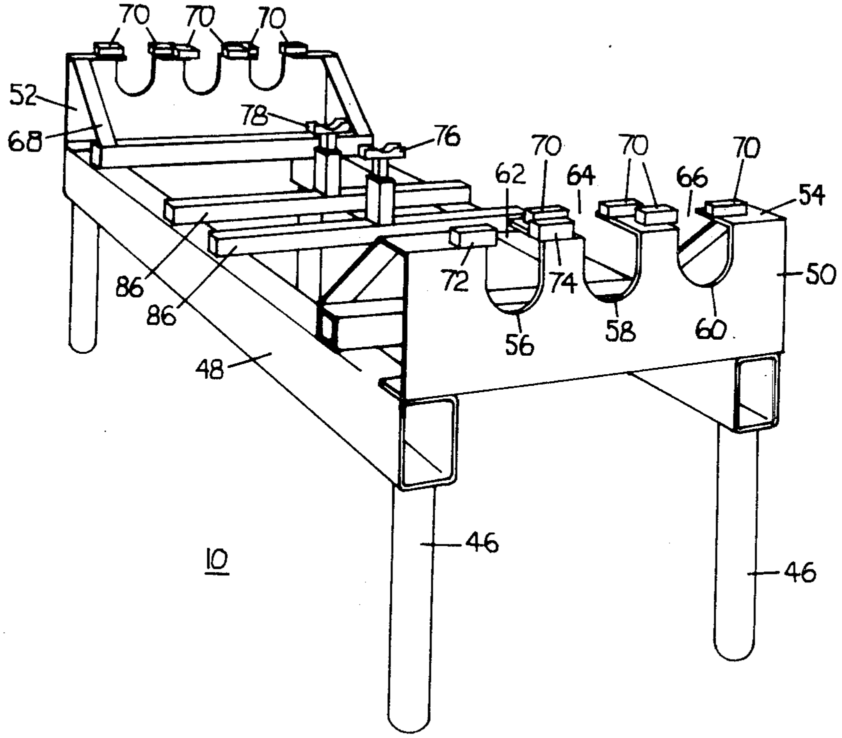
FIG. 2 is a perspective view of the trailer axle re-centering stand.

The trailer axle re-centering and shortening stand 10 is shown in a perspective view in FIG. 2. The function of the trailer axle re-centering stand 10 is re-centering trailer axle suspensions used in conjunction with mobile homes. Thus, to best understand the particular configuration of the trailer axle re-centering stand 10, the relationship and construction of the trailer axle 12 and the trailer axle suspension 14 in a conventional trailer axle is illustrated in FIG. 1.

FIG. 1 is a perspective view of one end of a trailer axle 12. The trailer axle hub 16 and trailer axle suspension 14 are affixed to the trailer axle 12. When a mobile home is moved, the trailer axles 12 are positioned under the mobile home. The trailer axles suspensions 14 are affixed to the under-carriage of the mobile home. With axles affixed to the under-carriage and tires affixed to the axles, the mobile home is ready for travel.

Once a mobile home reaches its destination, however, the trailer axles 12 and affixed suspensions 14 have no function unless the mobile home is moved again. Thus, parties are now salvaging trailer axles from older, in-place mobile homes for use in moving new mobile homes. However, the distance between trailer axle suspensions 14 is often not correct for the specifications of the new mobile home. Also, the trailer axles are often too long to fit the new mobile homes and must be shortened.

At the end of the trailer axle 12 is positioned the trailer axle hub 16. The trailer axle hub 16 is capable of receiving and securing a wheel used in the moving of a mobile home.

Positioned within the trailer axle hubs 16 are the trailer axle suspensions 14. Although FIG. 1 only illustrates one trailer axle suspension 14 at one end of trailer axle 12, it is to be understood that the trailer axle suspension 14 is constructed identically at both ends of the trailer axle 12 and, therefore, the re-centering of the trailer axle suspensions 14 at either end of the trailer axle 12 is identical.

The spring pad 18 has an upper plate 20 from which two spring pad sides 22 and 24 depend. Both spring pad sides 22 and 24 have a particular circular cutout 26 of a radius which allows both spring pad sides 22 and 24 to fit securely about a portion of the outer circumference of the trailer axle 12. The spring pad 18 is affixed to the trailer axle 12 by welding the partial circular cutout 26 of the spring pad sides 22 and 24 to the trailer axle 12.

When the user wishes to re-center the trailer axle suspensions 14, the partial circular cutouts 26 of the spring pad sides 22 and 24 are cut from the trailer axle 12. This is most often accomplished by a torch cut. Once the cut is made, and U-bolts 34 and 36 are loosened, the trailer axle suspensions 14 may be slid along the trailer axle 12.

Abutting the upper plate 20 of the spring pad 18 is the suspension spring 28. The suspension spring 28 has spring coils 30 at either end of the suspension spring which fit in the undercarriage of the mobile home. The suspension spring 28 provides torsion between the mobile home and the trailer axle 12. Above the suspension spring 28 is the spring plate 32. To hold the suspension spring 28 in position, two U-bolts 34 and 36 surround the trailer axle 32 and position themselves through the spring plate 28 where they are held in position by nuts 38, 40, 42 and 44. When the U-bolts 34 and 36 are secured, the spring plate 32 holds the suspension spring 28 secure. The spring plate 32 secures the suspension spring 28 in abuttment with the upper plate 20 of the spring pad 18.

When re-centering the trailer axle suspensions 14, after the spring pads 18 are cut from the trailer axle 12, the U-bolts 34 and 36 are loosened allowing the trailer axle suspension 14 to be slid along the trailer axle to reach the proper distance between the two trailer axle suspensions. After the trailer axle suspensions 14 are cut from the trailer axle 12, the user is ready to utilize the trailer axle re-centering stand 10.

The trailer axle re-centering stand 10 has legs 46 which affix to horizontal supports 48. The length of the trailer axle re-centering stand is less than the length between the trailer axle hubs 16 of conventional trailer axles.

Affixed at either end of the stand 10 are stand side walls 50 and 52. Each side wall 50 and 52 has a side wall platform affixed at right angles to both side walls 50 and 52. In the preferred embodiment the trailer axle re-centering stand 10 is shown with the capability of re-centering trailer axle suspensions 14 at three different dimensions.

In the preferred embodiment, the stand side walls 50 and 52 each have three side cutouts 56, 58 and 60 at the upper elevation of the stand side walls 50 and 52. The side cutouts are generally "U" shaped. The diameter of the side cutouts is greater than the diameter of the trailer axle 12. It is to be understood that a greater number of cutouts can be used by the stand, the number only governed by production considerations.

The side wall platform 54 contains platform openings 62, 64 and 66. The width of the platform openings are equal to the width of the side cutouts 56, 58 and 60. Thus, the trailer axle 12 may be lowered below the elevation of the platform 42. The stand side walls 50 and 52 are supported by braces 68.

Attached to the side wall platform 54 are blocks 70. The dimensions of the blocks 70 are such that the spring pads 18 fit snugly over the blocks 70 when the spring pads 18 are dropped over the blocks 70.

Figure 3:
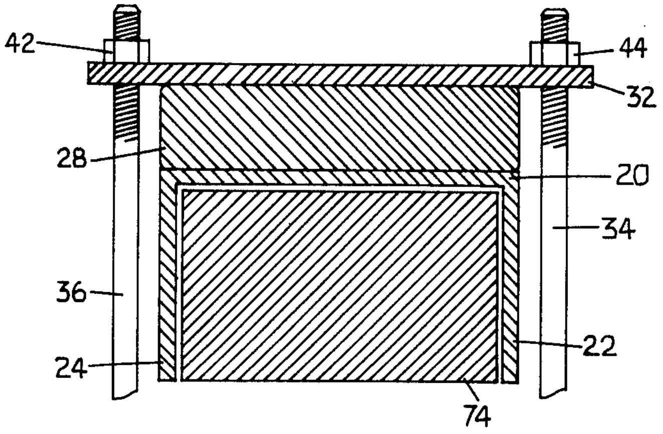
FIG. 3 is a side view of the spring pad taken along lines 3—3 positioned over a block of the trailer axle re-centering stand.

As set forth in FIG. 3, the trailer axle suspensions 14 are loosened from the trailer axle 12. The trailer axle 12 is lifted over the top of the desired side cutouts 56, 58 or 60 depending on the desired length between trailer axle suspensions 14. In this example, the trailer axle suspension 14 is lifted over side cutouts 56. The spring pad 18 is positioned over the top of blocks 72 and 74. Blocks 72 and 74 extend over the width of the diameter of the U-shaped side cutout 56. Thus, the distance between the two blocks is less than the width of the U-shaped cutout 56. The trailer suspension 14 is, thus, lowered over both stand side walls 50 and 52. The spring pads 18 are lowered until the upper plate 20 of the spring pads 18 abuts blocks 72 and 74. The width between the spring pad side walls 22 and 24 is approximately equal to the blocks 72 and 74. Thus, the spring pad 18 is held in position by the blocks 72 and 74, and the trailer suspensions 14 are thus at the proper centering distance.

Once the suspensions are at the proper distance, the operator then makes sure that the distance between the trailer axle suspension 14 and the hub 16 are equal on either side. After this is determined the accuracy of the centering of the trailer axle suspensions 14 in relation to the trailer axle 12 is assured.

By having three separate U-shaped cutouts and various positioning of the blocks 70 on the side wall platform 54, various centering distances between the trailer axle suspensions 14 may be achieved.

Figure 4:
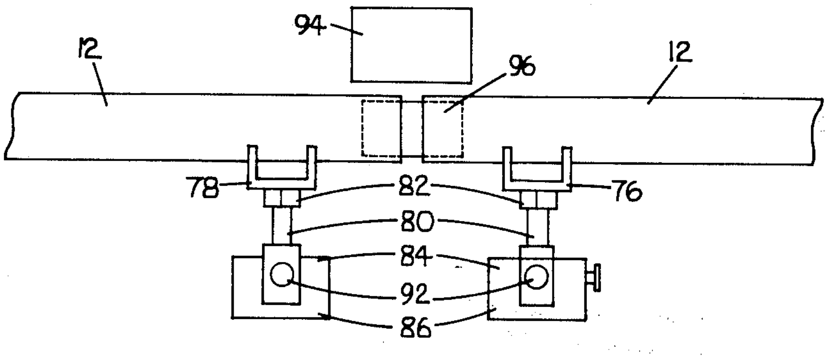
FIG. 4 is a front view of a trailer axle after having been cut down for shortening by cutting a section out of the center of the axle. The trailer axle is readied for placement of a sleeve by resting on saddles at the proper camber. An inside tubing insert is also shown in position for welding.
Figure 5:
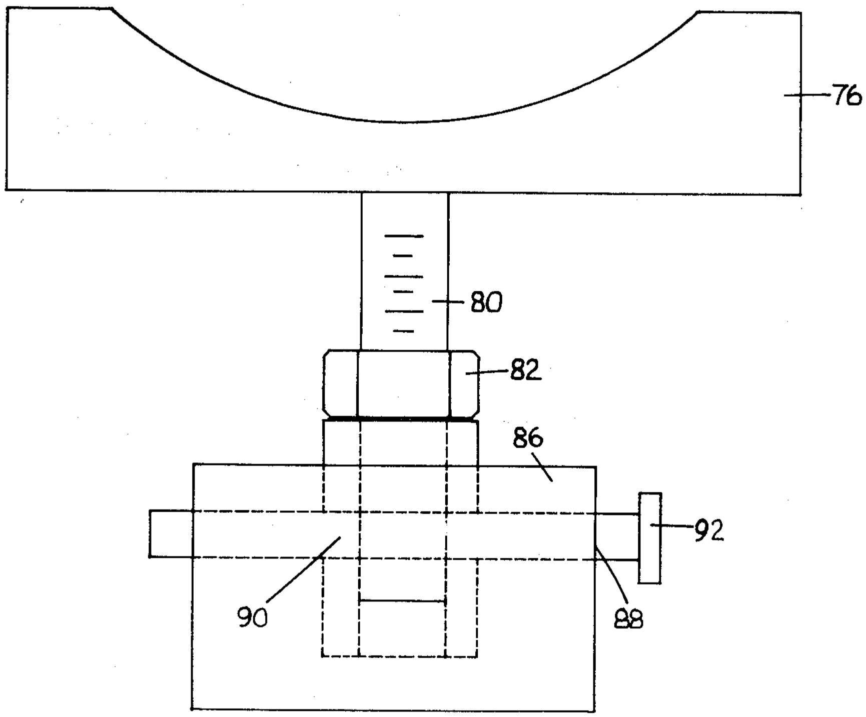
FIG. 5 is a detailed side view of the saddle as threaded into the inside diameter threaded tubing. The inside diameter threaded tubing is also illustrated as connected to the saddle support tubing.

As set forth in FIG. 4, the camber of the trailer axle 12 is such that it is slightly bowed. The trailer axle bows in the middle so that when the mobile home is placed on the trailer axle 12, the weight of the mobile home will straighten out the bow in the trailer axle. Without the bow in the trailer axle, the mobile home's weight will cause the trailer axle to sag in the middle and thus be ineffective.

Once the suspensions 14 are in place and the proper camber is achieved, the nuts 38, 40, 42 and 44 are tightened thereby clamping the U-bolts 34 and 36 about the trailer axle 12 and the spring plate 32. After this is achieved the spring pad 18 is once again welded to the trailer axle 12 in the new position. Thus, the trailer axle is ready for the specifications of the new mobile home.

The trailer axle re-centering stand 10 is also capable of assisting in another recyling function with trailer axles 12. Often, the distance between the trailer axle hubs 16 and the spring centers is too great. In order for the trailer axle 12 to be used, the trailer axle 12 must be shortened.

In order to achieve this shortening, a portion of the trailer axle is cut out. In order to meet the proper distance requirements, the trailer axle suspensions 14 are positioned over the desired blocks 58. The saddles are then placed under the cut portions of the trailer axle 12 giving the cut trailer axle 12 support and also assuring the trailer axle 12 proper camber.

In order that the proper camber can be assured, two saddles 76 and 80 are positioned approximately midway between the two stand side walls 50 and 52. Saddle 76 is attached to threaded rod 80. Threaded onto threaded rod 80 is lock nut 82.

Inside diameter threaded tubing 84 is capable of receiving threaded rod 80, and when the lock nut 82 is tightened the saddle 76 is, therefore, fastened in the desired position.

Inside diameter threaded tubing 84 is capable of being positioned with the diameter of the saddle support rod 86. The saddle support rod 86 has hole 88. The inside diameter threaded tubing 84 has hole 90. When the inside diameter threaded tubing 84 is properly positioned within the saddle support rod 86, the holes 88 and 90 are in perfect alignment, thereby allowing the user to slide pin 92 into place thereby locking saddle support rod 86 and inside the diameter threaded tubing 84 together. This provides the operator with the ability of completely removing saddles 76 and 80 if desired. Further, the threaded rod 80 provides for the fine adjustment of the saddle height and, therefore, the fine adjustment of the camber. As set forth in FIG. 4, a sleeve 94 is welded outside the circumference of the trailer axle or an inside tubing insert 96 is welded to the trailer axle 12. The stand thereby assures the proper distance between the suspensions 14 and the proper camber of the trailer axle 12.

Although a particular preferred embodiment of the invention has been disclosed above for illustrative purposes, it will be understood that variations or modifications thereof which lie within the scope of the appended claims are contemplated.

I claim:

1. A stand for the re-centering and shortening of trailer axle suspensions comprising:

two side walls each with a cutout larger than a trailer axle, the cutouts in both walls being aligned such that a trailer axle placed within the cutouts would be perpendicular to the side walls;

a means of holding the two side walls at a given elevation and parallel to one another at a given distance;

four blocks whose dimensions are such that a spring pad of a trailer axle suspension may be placed over the blocks and held in place;

a means of attaching the blocks to the side walls so that each block partially extends over the top of each side of the cutouts on both side walls thereby leaving a distance between each block greater than the diameter of conventional trailer axles but less than the width of the cutout;

two saddles; and a means of positioning the saddles between the two side walls such that the saddles will support the trailer axle that may be positioned with the cutouts of either side wall.

2. The stand for re-centering and shortening of trailer axle suspensions in claim 1 wherein the means for positioning the two saddles between the two side walls comprises:

a saddle support running parallel to one side wall at a position less than one-half the distance between the side wall and the opposing side wall;

a saddle support rod running parallel to the side wall designated the opposing side wall at a position less than one-half the distance between the opposing side wall and the first side wall;

a means of attaching a saddle to one saddle support rod; and a means of attaching a saddle to the remaining saddle support rod.

3. The stand for re-centering and shortening of trailer axle suspensions in claim 2 wherein the means of attaching the saddles to the saddle support rods comprises:

a threaded rod attached to each saddle;

a lock nut threaded onto the threaded rod;

a tubing capable of being affixed to the saddle support rod and also threaded within its diameter thereby capable of receiving the threaded rod.

4. The stand for re-centering and shortening of trailer axle suspensions in claim 3 wherein the means for holding the two side walls at a given elevation comprises a pair of legs beneath each side wall and horizontal supports between the side walls.

5. The stand for re-centering and shortening of trailer axle suspensions in claim 4 wherein the means for attaching the blocks to the side walls comprises two platforms one platform affixed at right angles to the inner side of each side wall, each platform having an opening through the width of the platform, the width of the platform opening approximately the width of the side wall cutout.

* * * * *